Patented Jan. 25, 1938

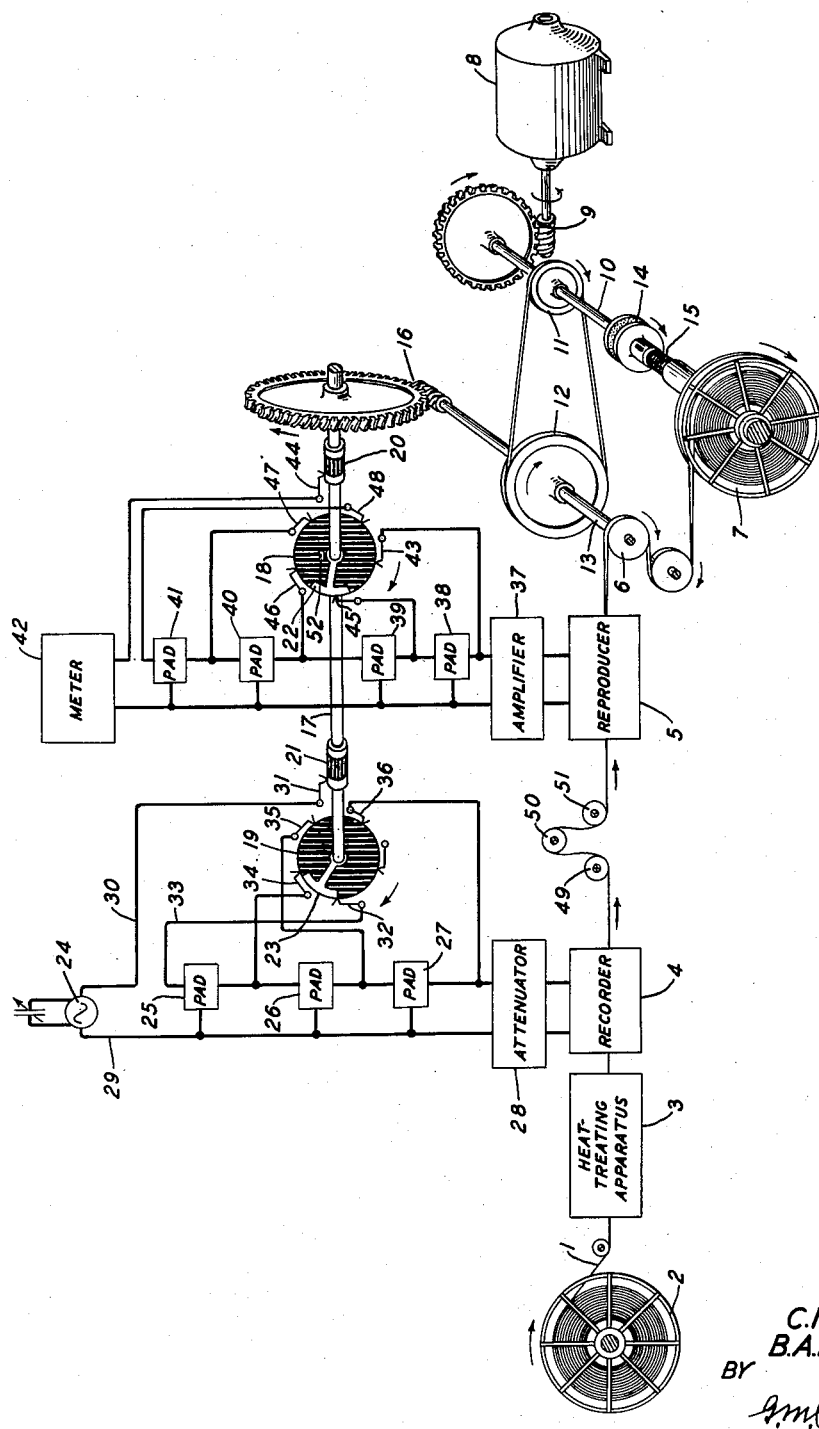

2,106,350

UNITED STATES PATENT OFFICE 2,106,350

TESTING SYSTEM

Clarence N. Hickman, Jackson Heights, and Burton A. Kingsbury, Brooklyn, N. Y., assignors to Bell Telephone Laboratories, Incorporated, New York, N. Y., a corporation of New York Application March 27, 1936, Serial No. 71,102

6 Claims. (Cl. 179—100.2)

This invention relates to testing systems and the object of the invention is a system for the continuous testing of telegraphone record members.

It is well known that the recording properties of telegraphone record members are greatly improved by suitable heat treatment and best results are obtained by a continuous method such as that disclosed in a copending application of W. C. Ellis and E. S. Greiner, Serial No. 71,128, filed March 27, 1936. Particularly when long lengths are being treated, it is highly desirable to determine the recording properties while the heat treatment is in progress so that adjustments may be made as soon as required thereby making it possible to obtain uniform properties throughout the tape length with a single treatment.

Among the qualities which make a magnetic tape or wire suitable for recording purposes are a low noise level and the ability to respond to signal currents of large amplitude. As the amplitude of the signal currents applied to the recording magnets is increased, the amplitude of the signal recorded in the tape increases substantially linearly over a considerable range of current amplitudes but ultimately a point is reached at which no further increase in the signal strength can be obtained. This maximum value of the signal strength fixes the upper limit of the volume range of the tape as a record member. When a tape having no recorded signal is passed between the magnets of a reproducing system, more or less noise will be heard. A portion of this noise is due to the magnetic characteristics of the tape itself and the level of this inherent noise fixes the lower limit of the volume range of the tape.

According to the general features of this invention the record member, as it emerges from the heat-treating apparatus, is subjected to the action of recording and reproducing magnets. The recording magnets are adapted to be energized by signal currents and the output of the reproducing magnets is continuously recorded by suitably calibrated measuring apparatus. In some cases it may be desirable to measure both the noise and the signal levels continuously and in such cases a second set of reproducing magnets disposed ahead of the recording magnets is required for determining the noise level. In most cases, however, the variations in the recording properties of the member will not change appreciably over short lengths and it will be satisfactory to use a single set of reproducing magnets and to deenergize the recording magnets at intervals to permit recordings of the noise level to be made.

With either of these systems, the signal currents should be of sufficient amplitude to impress on the tape the maximum signal it can record and when this is done the difference between the noise level reproduced from the portions of the member having no recorded signal and the level of the signals reproduced from the other portions will be the volume range of the member and may be determined by inspection of the measuring apparatus.

According to a further feature of the invention, the recording properties of the member are tested at a plurality of signal levels and the effective gain of the reproducing circuit is adjusted to compensate for these variations in recording level in such a manner as to keep the input to the measuring apparatus within its operating range. In the preferred embodiment, the mechanism for moving the record member also operates suitable switching contacts for changing the levels in the recording and reproducing circuits. The switching operations in the reproducing circuit are effected after those in the recording circuit by the time interval required for the member to move from the recorder to the reproducer so that the input to the measuring apparatus is kept within its operating range for substantially the full duration of test at each signal level.

One form of this preferred embodiment is illustrated in the single figure of the drawing. The tape or wire 1 is drawn from a feed reel 2 through the heat-treating apparatus 3 between the recording magnets 4 and the reproducing magnets 5 at a suitable speed by the pulley 6 and is wound up on the take-up reel 7. The recording magnets 4 are preferably of the type disclosed in Patent 1,944,238 to Hickman, January 23, 1934. The polarizing and depolarizing windings of the magnets for erasing previous tape history and preparing the tape to receive a signal are kept energized when the recording current is opened so that the noise level of the tape is measured under the conditions of its subsequent use. The driving mechanism for the tape comprises a motor 8 connected by worm gearing 9 to a shaft 10 which carries a pulley belt 11 connected to the pulley 12 on the shaft 13 on which the driving pulley 6 is mounted. The reel 7 is connected to the shaft 10 through a friction clutch 14 which is adjusted by means of a spring 15 to keep the tape wound up without subjecting it to excessive tension.

The shaft 13 is connected by worm gearing 16 to a shaft 17 which carries the switching devices 18 and 19 which are insulated from each other and from the gearing 16 by insulating couplings 20 and 21. The switching devices comprise discs of insulating material with conducting segments 22 and 23, the segment 23 being secured to the shaft 17 by the screw 52 in advance of the segment 22 by such an angle that an element of the tape will move from the magnets 4 to the magnets 5 while the shaft 17 is rotating through the angle between the segments 22 and 23.

In the position of the mechanism shown in the drawing, the oscillator 24, or other suitable source of signal currents of adjustable frequency, is connected through the attenuating network pads 25, 26, 27 and 28 to the recording magnets 4 over a circuit comprising conductors 29 and 30, contact 31 on the coupling 21, segment 23 and contact 32 which is connected to the pads by the conductor 33. In this position, all of the pads are in circuit and the attenuator 28 is adjusted to give the desired minimum input to the magnets.

Upon further rotation of the switching device 19, the segment 23 breaks contact 32 and moves into engagement with contact 34 thereby eliminating the pad 25 from the circuit and correspondingly increasing the signal level impressed on the magnets 4. When the segment 23 engages contact 35, pad 26 is also eliminated and when it engages contact 36, all three pads 25, 26 and 27 are disconnected and the maximum signal level is recorded. When the segment leaves contact 36, the recording circuit is opened and remains open until the segment again engages the contact 32 so that for each revolution of the shaft 17 successive portions of the tape leaving the magnets 4 carry no signal or signals recorded at one of four different levels.

The circuit associated with the reproducing magnets 5 comprises an amplifier 37, four attenuating network pads 38 to 41, and a meter 42 which records the variations in its input on a decibel scale. One such meter is described in the Journal of the Acoustical Society, Vol. VI, pages 121 to 129 (January 1935).

As previously stated, the segment 22 of switching device 18 is displaced on the shaft 17 from the segment 23 of the device 19 by the angle through which the shaft 17 turns while an element of tape moves from the magnets 4 to the magnets 5. When the segment 23 leaves the contact 36 the recording circuit is opened and the tape leaving the magnets 4 carries no signal. At about the time the first element of this blank portion of the tape reaches the reproducing magnets 5, the segment 22 closes contact 43 and completes a circuit from the amplifier to the recorder through the contact 44 on the shaft 17. The level of the noise reproduced from the tape is, therefore, increased by the full gain of the amplifier 37 and impressed on the meter 42 at sufficient amplitude to be recorded on the desired portion of the record strip which may be, for example, toward the lower end of the decibel scale.

When the first portion of the tape having a low level signal recorded in it reaches the magnets 5, segment 22 closes contact 45 thereby connecting pad 38 into the reproducing circuit and attenuating the amplifier output to a level within the range of the meter and preferably somewhat above that of the noise level. It will be observed that the tape leaving the recording magnets passes over a series of idler pulleys 49, 50 and 51 before reaching the reproducing magnets. These pulleys stress the tape in the same manner as and to at least the extent to which it is likely to be stressed in subsequent use. This reduces the signal level in the tape to its stable value so that the measured values of volume range will not be in excess of those obtainable in later use of the tape.

As the portions of tape having higher signal levels reach the magnets 5, the segment 22 is successively connected to contacts 46, 47 and 48 and the output of the amplifier 37 is progressively reduced in appropriate steps by the insertion of the pads 39, 40 and 41 in the circuit leading to the recorder.

Since neither the noise level nor the reproduced signal level will ordinarily vary a great deal during the short time interval between the changes in the signal level impressed on the tape, the recorder will trace a substantially straight line or a series of short lines in different portions of the scale depending on the attenuation introduced by the various pads. In any case, the record strip may be calibrated longitudinally in accordance with the various signal levels used and transversely on a decibel basis so that the volume range being obtained by the heat treatment of the tape may be readily determined by inspection. As soon as the volume range indicated exhibits a tendency to decrease, the operator can increase his furnace temperature or make any other adjustments necessary to maintain the volume range within the desired limits.

Applicants have found that when the tape speed is of the order of four inches per second, very good results are obtained by changing the signal level every fifteen seconds. When the tape is tested at a number of different recording levels it may be desirable to measure the noise level two or more times during each cycle. Obviously, this may be readily accomplished by a rearrangement of the contacts so that the recording circuit is opened several times for each revolution of the segment 23.

While the invention has been described with reference to a particular embodiment for purposes of illustration, it will be understood that the system may be changed in various other respects to suit the requirements of a particular case. For example, the attenuating networks may be replaced by known equivalents such as potentiometers or the levels in the two circuits may be changed by varying the gains of amplifiers in the circuits in any of the ways known in the art.

What is claimed is:

1. A system for measuring the recording properties of telegraphone record members comprising means for moving the member, recording and reproducing magnets in spaced relation along the member, signal measuring apparatus, a circuit including an amplifier connecting the reproducing magnet to the measuring apparatus, a signal source of adjustable frequency, and means for alternately connecting the source to the recording magnet and disconnecting it therefrom and varying the effective gain of the amplifier at predetermined intervals whereby said apparatus alternately measures both the noise and signal levels of the record member.

2. A system for measuring the recording properties of telegraphone record members comprising means for moving the member, recording and reproducing magnets in spaced relation along the member, signal measuring apparatus, a circuit including an amplifier connecting the reproducing magnet to the measuring apparatus, means for alternately energizing and deenergizing the recording magnet, and means operative when the recording magnet is deenergized for increasing the effective gain of the amplifier.

3. A system for measuring the recording properties of telegraphone record members comprising means for moving the member, recording and reproducing magnets in spaced relation along the member, signal measuring apparatus, a circuit including an amplifier connecting the reproducing magnet to the measuring apparatus, means for supplying a varying input to the recording magnet, and means for changing the effective gain of the amplifier to compensate for the input variations and keeping the energy level in said circuit within the range of the measuring apparatus.

4. In a system for measuring the recording properties of telegraphone record members, the combination with the driving means for the member, recording and reproducing circuits including magnets cooperating with the member, a source of signal currents for the recording circuit and measuring apparatus responsive to the output of the reproducing magnet, of means for periodically changing the input levels to the recording magnet and to the measuring apparatus, and means for delaying the changes effected in the input level to the measuring apparatus with respect to corresponding changes in input to the recording magnet.

5. A system according to claim 4 in which the means for changing the input levels comprises an attenuating network for each of the circuits and contacts operated by the driving means for connecting the networks to and disconnecting them from the recording and reproducing circuits.

6. A system according to claim 4, in which the delaying means is adjusted so that the changes in the input level to the measuring apparatus are delayed with respect to the corresponding changes in the input to the recording magnet by substantially the time interval required for an element of the record member to move from the recording magnet to the reproducing magnet.

CLARENCE N. HICKMAN.
BURTON A. KINGSBURY.